(12) United States Patent
Komaromy et al.

(10) Patent No.: US 9,262,627 B2
(45) Date of Patent: Feb. 16, 2016

(54) METHODS, DEVICES, AND SYSTEMS FOR DETECTING RETURN ORIENTED PROGRAMMING EXPLOITS

(71) Applicant: QUALCOMM Incorporated, San Diego, CA (US)

(72) Inventors: Daniel Komaromy, Budapest (HU); Alexander Gantman, Solana Beach, CA (US); Brian Rosenberg, San Diego, CA (US); Arun Balakrishnan, San Diego, CA (US); Renwei Ge, San Diego, CA (US); Gregory Rose, San Diego, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/473,736

(22) Filed: Aug. 29, 2014

(65) Prior Publication Data

US 2014/0372701 A1    Dec. 18, 2014

Related U.S. Application Data

(62) Division of application No. 13/290,932, filed on Nov. 7, 2011, now Pat. No. 8,839,429.

(51) Int. Cl.
*G06F 11/30* (2006.01)
*G06F 12/14* (2006.01)
(Continued)

(52) U.S. Cl.
CPC ............ *G06F 21/52* (2013.01); *G06F 11/3037* (2013.01); *G06F 11/3466* (2013.01);
(Continued)

(58) Field of Classification Search
CPC ....... G06F 21/52; G06F 21/54; G06F 21/554; G06F 21/56; G06F 21/566; G06F 12/14; G06F 12/0802; G06F 12/0811; G06F 12/0848; G06F 12/0815; G06F 11/34; G06F 11/3466; G06F 11/3477; G06F 11/3037
See application file for complete search history.

(56) References Cited

U.S. PATENT DOCUMENTS 5,956,477 A * 9/1999 Ranson et al. .................. 714/30
6,047,363 A * 4/2000 Lewchuk ...................... 711/213
(Continued)

FOREIGN PATENT DOCUMENTS

CN    101924761 A    12/2010
EP    1331539 A2    7/2003
(Continued)

OTHER PUBLICATIONS

Shinagawa T., "Method for Preventing Buffer Overflow Attacks Bypassing NXbit Protection", The Special Interest Group Technical Reports of Information Processing Society of Japan, 2006-CSEC-34, Computer Security, Japan, Information Processing Society, Jul. 21, 2006, vol. 2006, No. 81, pp. 215-222.
(Continued)

*Primary Examiner* — Zachary A Davis
(74) *Attorney, Agent, or Firm* — Won Tae C. Kim

(57) ABSTRACT

Methods, devices, and systems for detecting return-oriented programming (ROP) exploits are disclosed. A system includes a processor, a main memory, and a cache memory. A cache monitor develops an instruction loading profile by monitoring accesses to cached instructions found in the cache memory and misses to instructions not currently in the cache memory. A remedial action unit terminates execution of one or more of the valid code sequences if the instruction loading profile is indicative of execution of an ROP exploit involving one or more valid code sequences. The instruction loading profile may be a hit/miss ratio derived from monitoring cache hits relative to cache misses. The ROP exploits may include code snippets that each include an executable instruction and a return instruction from valid code sequences.

20 Claims, 8 Drawing Sheets

(51) Int. Cl.
*G06F 21/52* (2013.01)
*G06F 21/56* (2013.01)
*G06F 12/08* (2006.01)
*G06F 21/55* (2013.01)
*G06F 11/34* (2006.01)

(52) U.S. Cl.
CPC ........ *G06F12/0811* (2013.01); *G06F 12/0875* (2013.01); *G06F 12/14* (2013.01); *G06F 21/554* (2013.01); *G06F 21/566* (2013.01); *G06F 12/0848* (2013.01); *G06F 2212/452* (2013.01)

(56) References Cited

U.S. PATENT DOCUMENTS

| | | | |
|---|---|---|---|
| 6,134,710 | A | 10/2000 | Levine et al. |
| 7,086,088 | B2 * | 8/2006 | Narayanan ................. 726/22 |
| 7,574,587 | B2 | 8/2009 | DeWitt, Jr. et al. |
| 7,774,550 | B2 | 8/2010 | Nomura et al. |
| 7,818,747 | B1 | 10/2010 | Fedorova et al. |
| 8,266,423 | B2 * | 9/2012 | Giraud et al. ................ 713/152 |
| 8,490,061 | B2 * | 7/2013 | Chung et al. ................ 717/128 |
| 8,689,201 | B2 * | 4/2014 | van den Berg et al. ....... 717/159 |
| 8,997,218 | B2 * | 3/2015 | Hentunen .................. 726/22 |
| 2005/0102539 | A1 | 5/2005 | Hepner et al. |
| 2005/0210471 | A1 | 9/2005 | Okawara |
| 2007/0150881 | A1 * | 6/2007 | Khawand et al. ............ 717/162 |
| 2010/0218251 | A1 * | 8/2010 | Walsh ........................ 726/22 |
| 2012/0030758 | A1 | 2/2012 | Van Den Berg et al. |
| 2012/0167120 | A1 * | 6/2012 | Hentunen .................. 719/320 |
| 2013/0117843 | A1 | 5/2013 | Komaromy et al. |

FOREIGN PATENT DOCUMENTS

| | | |
|---|---|---|
| JP | 2000035894 A | 2/2000 |
| JP | 2009217385 A | 9/2009 |
| JP | 2010538371 A | 12/2010 |
| WO | WO-2004044745 A1 | 5/2004 |
| WO | WO-2006001574 A1 | 1/2006 |
| WO | WO-2009029643 A2 | 3/2009 |

OTHER PUBLICATIONS

Chen, P., et al., "Efficient Detection of the Return-Oriented Programming Malicious Code," Lecture Notes in Computer Science, vol. 6503, 2010, pp. 140-155.

International Search Report and Written Opinion—PCT/US2012/063953—ISA/EPO—Oct. 18, 2013.

* cited by examiner

METHODS, DEVICES, AND SYSTEMS FOR DETECTING RETURN ORIENTED PROGRAMMING EXPLOITS

CROSS-REFERENCE TO RELATED APPLICATIONS

This application is a divisional of prior application Ser. No. 13/290,932, filed Nov. 7, 2011, which application is incorporated by reference herein.

BACKGROUND

1. Field

One feature generally relates to detection of malicious code in software systems, and more particularly, to methods and devices that detect return-oriented programming exploitation in software systems.

2. Background

Computing systems executing software are under a growing array of attacks from attackers commonly referred to as hackers. These attackers have found ways to insert malicious code into a computing system, and then cause the computing system to execute the malicious code. The malicious code may perform many different operations, such as, cause the computing system to run slower than normal, monitor activity on the computing system, cause the computing system to transmit or receive information that a user may not want communicated, corrupt data in persistent and non-persistent memory, and crash the computing system.

Recently attack mechanisms sometimes called Return-Oriented Programming (ROP) exploits have been proposed. One class of ROP exploit is often referred to as a return-to-libc attack because it uses a standard C library resident in many software systems. An ROP exploit is a powerful technique that allows the attacker to exploit valid code sequences in software programs without injecting any new malicious code into the processor's address space. Small snippets of valid code sequences, often referred to as gadgets, may be found by the attacker, then strung together to form new malicious code sequences, thereby sidestepping defenses against code injection.

In ROP exploits, the small code snippets are portions of code that end with a return instruction. When a function is called, an address of the instruction after the call is pushed onto a stack as an address to return to after the called function completes. Thus, the stack may include many return addresses for the processor to jump to when called functions complete. If the attacker can write information to the stack, the attacker can overwrite an intended return address with a malicious return address. This return address may be to one of the gadgets identified by the attacker.

By manipulating multiple return addresses, the attacker controlling the call stack can chain multiple gadgets together to create a malicious code sequence without ever injecting any new code into the processor's address space. Through a choice of these malicious code sequences and their arrangement, the attacker can induce arbitrary (yet still Turing-complete) behavior for a malicious program composed of the string of gadgets. This type of attack is successful because in most systems code and data addresses are predictable. That is, attackers can load particular code in their own computer, view their stack to determine how the code is being loaded, and use this information to exploit the return stack when such code is loaded in a target computer. Such attack may generally rely on code being loaded the same way across different computers.

Therefore, there is a need for robust counter-measures that can detect exploitation of vulnerabilities in stacks and perform remedial actions when such exploitations are detected.

SUMMARY

Various features of the present disclosure may be implemented in apparatuses, methods, and computer readable media. Such features may include detecting exploitation of vulnerabilities in stacks and performing remedial actions when such exploitations are detected.

In one aspect, a method is provided including executing an unintended sequence of code snippets in a processing circuit, where each code snippet includes at least one executable instruction including a control transfer instruction. One or more of the code snippets may include a modified control transfer instruction different from an originally intended control transfer instruction and at least one code snippet of the plurality is a non-cached code snippet not found in a cache memory. The method may also include developing an instruction loading profile by monitoring instruction fetches relative to cache misses, where the cache misses are fetched instructions absent from the cache memory on the instruction fetch (i.e., an individual cache miss represents a fetched instruction missing or absent from the cache memory in response to a corresponding instruction fetch of the executable code sequence). Execution of at least one code snippet of the unintended sequence may be terminated if the instruction loading profile is indicative of execution of some of the code snippets of the unintended sequence. Executing the unintended sequence of code snippets includes utilizing a multi-level cache as the cache memory and wherein cached instructions are instructions in a cache level closer to the processing circuit and wherein non-cached instructions are instructions in a main memory or a cache level farther from the processing circuit. The instruction loading profile may be developed or generated as a hit/miss ratio of fetches of cached instructions relative to non-cached instructions that is lower than a threshold selected relative to valid hit/miss ratios indicative of valid code sequences. The valid hit/miss ratios may be determined from monitoring hit/miss ratios from a plurality of executable code sequences known to be free from a return-oriented programming exploit during the monitoring.

In another aspect, a processing device including a processing circuit, cache monitor, and a remedial action unit is provided. The processing circuit may be configured for fetching and executing executable code sequences and a cache memory system may be provided that is operably coupled to the processing circuit and includes at least one cache memory. The cache monitor may be configured for developing an instruction loading profile by monitoring the instruction fetches relative to cache misses, where the cache misses are fetched instructions absent from the cache memory on the instruction fetch. The remedial action unit may be configured for performing remedial actions relative to the executable code sequences if the instruction loading profile is indicative of an unintended sequence of code snippets. Each code snippet includes at least one executable instruction including a control transfer instruction, wherein one or more of the code snippets includes a modified control transfer instruction different from an originally intended control transfer instruction and at least one code snippet of the sequence is a non-cached code snippet not found in the cache memory.

Still other aspects of the present disclosure include a processing device including means for executing an unintended sequence of code snippets in a processing circuit. Each code snippet includes at least one executable instruction including a control transfer instruction, wherein one or more of the code snippets includes a modified control transfer instruction different from an originally intended control transfer instruction and at least one code snippet of the plurality is a non-cached code snippet not found in a cache memory. The processing device also includes means for developing an instruction loading profile by monitoring instruction fetches relative to cache misses, where the cache misses are fetched instructions absent from the cache memory on the instruction fetch.

Other aspects of the present disclosure include a computer readable medium having instructions stored thereon, which when executed by a processing circuit cause the processing circuit to execute an unintended sequence of code snippets. Each code snippet includes at least one executable instruction including a control transfer instruction, wherein one or more of the code snippets includes a modified control transfer instruction different from an originally intended control transfer instruction and at least one code snippet of the plurality is a non-cached code snippet not found in a cache memory. The instructions also cause the processing circuit to develop an instruction loading profile by monitoring instruction fetches relative to cache misses, where the cache misses are fetched instructions absent from the cache memory on the instruction fetch.

DRAWINGS

DETAILED DESCRIPTION

Figure 1:
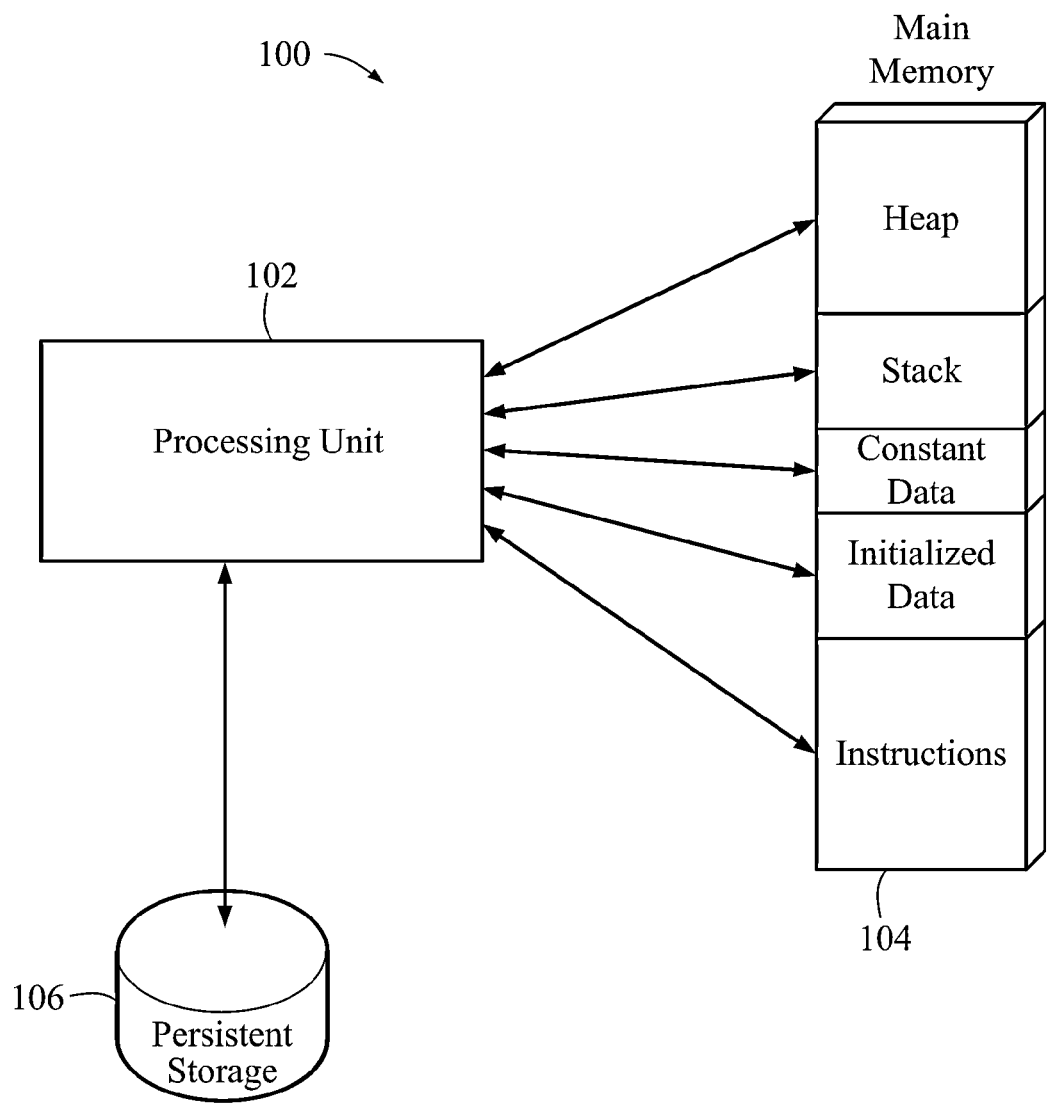
FIG. 1 is a block diagram illustrating an exemplary processing system 100 including a possible system memory organization.

In the following description, reference is made to the accompanying drawings in which is shown, by way of illustration, specific examples in which the disclosure may be practiced. The examples are intended to describe aspects of the disclosure in sufficient detail to enable those skilled in the art to practice one or more of the described features. Other features may be utilized and changes may be made to the disclosed examples without departing from the scope of the disclosure. The following detailed description is not to be taken in a limiting sense, and the scope is defined only by the appended claims.

The term "data" may be used herein interchangeably to refer to computing instructions that may be used by a processor and data that may be operated on by the processor. The context of the use of the term "data" should make it clear when "data" is referring to instructions. Where needed, instructions may be referred to explicitly as instructions or instruction data.

Overview

The present disclosure refers to apparatuses, methods, and computer readable media for detecting exploitation of vulnerabilities in stacks and performing remedial actions when such exploitations are detected.

According to one feature, a processor may load one or more lines of cache memory with executable code (e.g., from an external storage or main memory). The processor then executes the executable code by calling instructions from addresses (locations) within the cache memory and, for instructions not found in cache memory, loading new instructions into cache memory (e.g., from external/main memory) prior to or concurrent with calling said new instruction. The processor may monitor the number of times instructions found within cache memory are called versus the number of times instructions not found within cache memory are called in order to generate a hit/miss ratio. For instance, in conventional code, the need to load a new line (a "miss") may occur only once every 100 instructions or so, for example. By contrast, in an ROP attack, the need to load a new page may occur once every 3 instructions. The processor may terminate execution of an executable code sequence if the hit/miss ratio falls below a predefined threshold. The threshold may be selected to be lower than typical hit/miss ratios for legitimate programs. For instance, the hit/miss threshold may be empirically selected for each operating system and/or processor type. Because during initial boot-up of a processor or operating system there tends to be significant page switching or page loading, the monitoring step may be suspended during a boot-up stage (or other selected operational period) of the processor. In order to more quickly detect the occurrence of an ROP attack, the hit/miss ratio may be calculated over a fixed number of preceding instructions (e.g., the last 10, 50, or 100 instructions).

Exemplary Data Structures

Attackers have found ways to insert malicious code into computing systems. In response, many computing system designers have made it more difficult for attackers by implementing systems such as Data Execution Prevention (DEP) and Address Space Layout Randomization (ASLR).

DEP involves tagging information that a processor may use as either executable information or non-executable information. In many software systems, a hacker may cause the processor to fetch information that is considered data, and not instructions. The processor may interpret this data and execute it as an instruction that was not intended by the software programmer. This tagging of information as executable makes it more difficult for a hacker to cause the processor to execute data because it is tagged as non-executable.

Address space layout randomization (ASLR) involves randomly arranging positions within a processor's address space for key data and instruction areas such as bases of executable code, positions of libraries, positions of heaps, and positions of stacks.

However, Return-Oriented Programming (ROP) exploits avoid these protection mechanisms because ROP exploits do not require insertion of any code. Instead, they exploit snippets of good code by modifying return addresses on a call stack.

FIG. 1 is a block diagram illustrating an exemplary processing system 100 including a possible system memory organization. When executing software within the processing system 100 a processing unit 102 generally accesses persistent storage 106 to read in executable instructions in the form of code.

The persistent storage 106 may be any suitable structure for storing information in the form of instructions and data. By way of example, and not limitation, these storage media may include computer-readable media (CRM). This CRM may include, but is not limited to magnetic and optical storage devices such as disk drives, magnetic tapes, CDs (compact disks), DVDs (digital versatile discs or digital video discs), and other equivalent storage devices.

The executable instructions are stored in a main memory 104 along with other data structures that the processing unit 102 may use when executing code. Some example data structures shown in FIG. 1 include a heap, a stack, constant data, initialized data, and instructions. The heap is often used for dynamic allocation for various software programs while they may be active within the processing system 100. Various data, such as constant data and initialized data may be stored in the main memory 104 for access by one or more programs running on the processing system 100. Instructions associated with various programs may be stored in an instruction area, the heap, or combinations thereof.

There may be various stacks within the processing system 100. One stack of particular interest is often referred to as a call stack. Call stacks may be corrupted by ROP exploits, which may be detected by one or more features/aspects discussed herein responsive to monitoring of cache activity as discussed more fully below.

Figure 2:
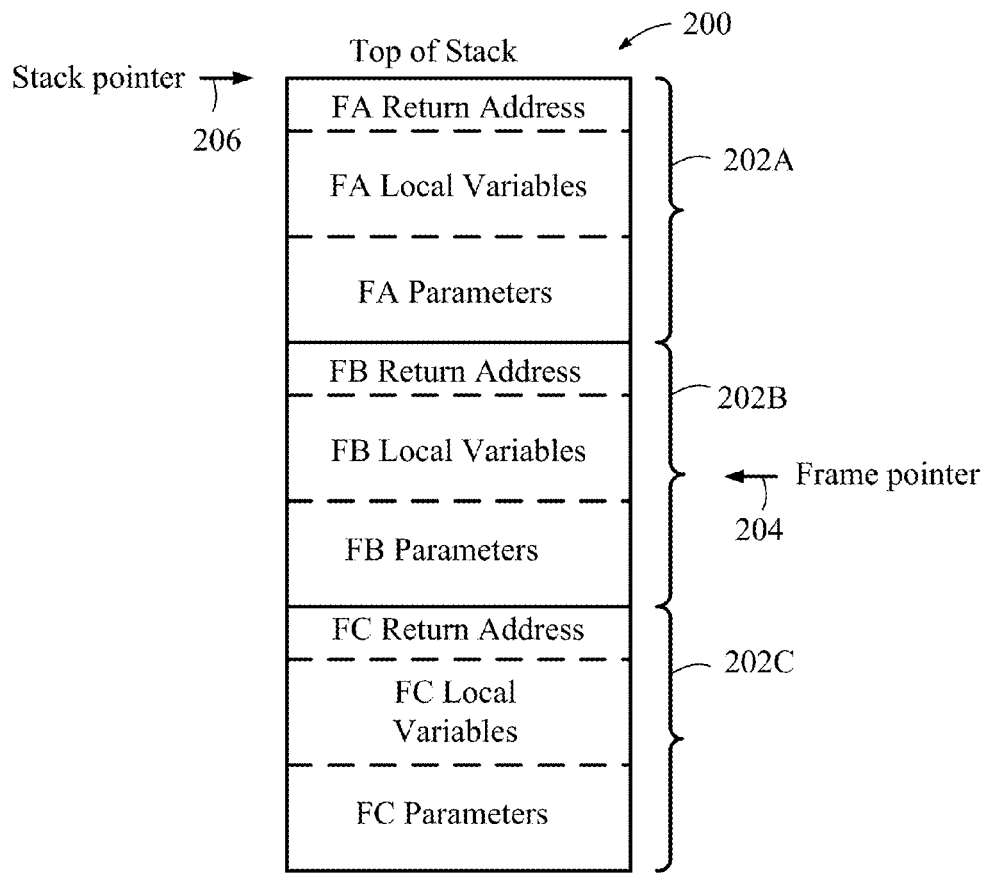
FIG. 2 illustrates an exemplary general call stack.

FIG. 2 illustrates an exemplary general call stack 200. The call stack 200 may be used to store various information that may be used when a function is called. Each function that is pushed on the stack occupies a frame 202 as indicated by the frames 202A, 202B, and 202C for called functions A, B, and C, respectively.

As a non-limiting example, each frame 202 of the call stack 200 may include information such as parameters that are passed from the caller function to the called function. The call stack 200 may also include an area of memory for storing various local variables that may be used by the called program. A return address indicating where in the calling function execution should continue after the called function has completed execution may also be included in the call stack 200. The call stack 200 operates as a Last In First Out (LIFO) buffer meaning that the last data pushed on the stack is the first data popped from the stack. The call stack 200 may be quite deep indicating that many function calls are nested within other functions.

A frame pointer 204 generally points to the frame 202 of the currently operating function. A stack pointer 206 points to the next position of data on the stack that is available to be popped off and returned to a processor.

ROP exploits take advantage of the stack data structure by writing a malicious address to the return address portion of various frames 202. Operations related to the call stack 200 that are corrupted by ROP exploits may be detected by one or more features and/or aspects discussed herein responsive to monitoring of cache activity, as is explained more fully below.

Figure 3:
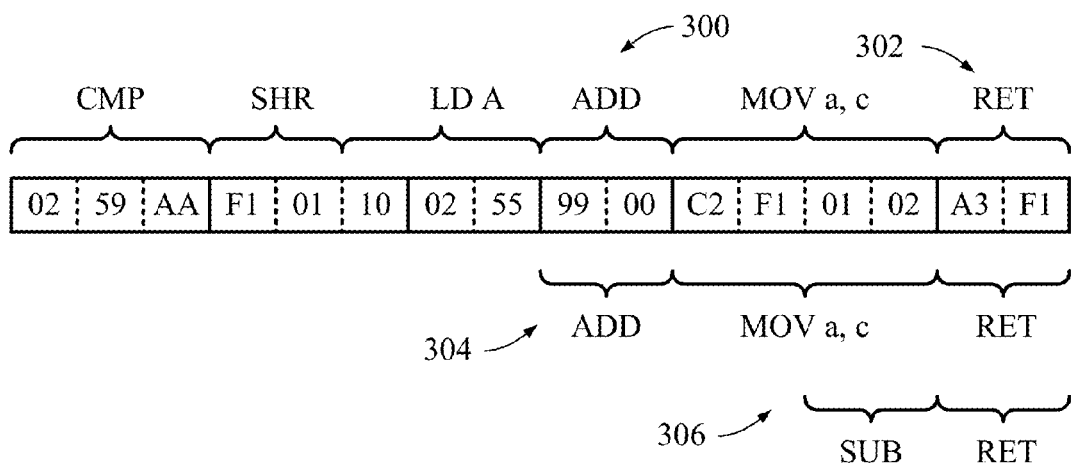
FIG. 3 illustrates exemplary gadgets constructed of small code snippets from a valid code sequence.

FIG. 3 illustrates gadgets 304 and 306 constructed of small code snippets from a valid code sequence 300. Instructions are illustrated in FIG. 3 as including one or more bytes of instruction data. As non-limiting examples, a valid code sequence 300 (may also be referred to as an executable code sequence) includes a compare (CMP) instruction of 3 bytes, a shift right (SHR) instruction of 2 bytes, a load accumulator (LD A) instruction of 3 bytes, an add (ADD) instruction of 2 bytes, a move from register c to register a (MOV a, c) instruction of 4 bytes, and a return (RET) instruction of 2 bytes. The instructions and encodings in the various bytes of the instructions shown in FIG. 3 are fabricated and not intended to be indicative of any specific instruction set.

Functions that may be called from other functions generally end with a return instruction 302. When the processor encounters the return instruction 302, it pops the top return address off the stack 200 (FIG. 2) to determine where execution should proceed. The top address on the stack should generally point to the address of the next instruction in the calling function after the call instruction in the calling function. However, in an attack using ROP exploits the return address may have been modified to point to a different address.

An attacker may identify the gadget 304 that performs a particular function that may be useful to the attacker. The gadget 304 ends with the return instruction 302 of the valid code sequence 300. However, it will generally start somewhere within the valid code sequence 300 to include useful instructions in front of the return instruction 302. Thus, the gadget 304 includes the add instruction followed by the move instruction followed by the return instruction 302.

Some instruction sets, such as Reduced Instruction Set Computer (RISC) instructions are generally fixed length, meaning that all the instructions are composed of the same number of bytes (e.g., 4 bytes). Other instructions sets, such as Complex Instruction Set Computer (RISC) instructions may vary in length as is illustrated in FIG. 3. With variable length instructions, the attacker has the opportunity to create new instructions that were not intended in the original valid code sequence 300. As a non-limiting example, the gadget 306 starts at a location within the move instruction of the valid code sequences 300, which may create a subtract instruction if the processor starts execution at that point. Thus, the gadget 306 includes a subtract instruction followed by the return instruction 302.

An attacker may examine code that would be resident in memory, such as, for example, the standard C library, or portions of the operating system. The attacker can then identify many of these gadgets 304 and 306 (i.e., small code snippets) to create a library of ROP instructions. These ROP instructions may then be strung together to create a useful, unintended, and malicious code sequence without inserting any code into memory. Rather, the attacker only has to change return addresses on the call stack 200 to point to the start of the desired gadgets 304 and 306.

Exemplary Architecture and Components

Figure 4:
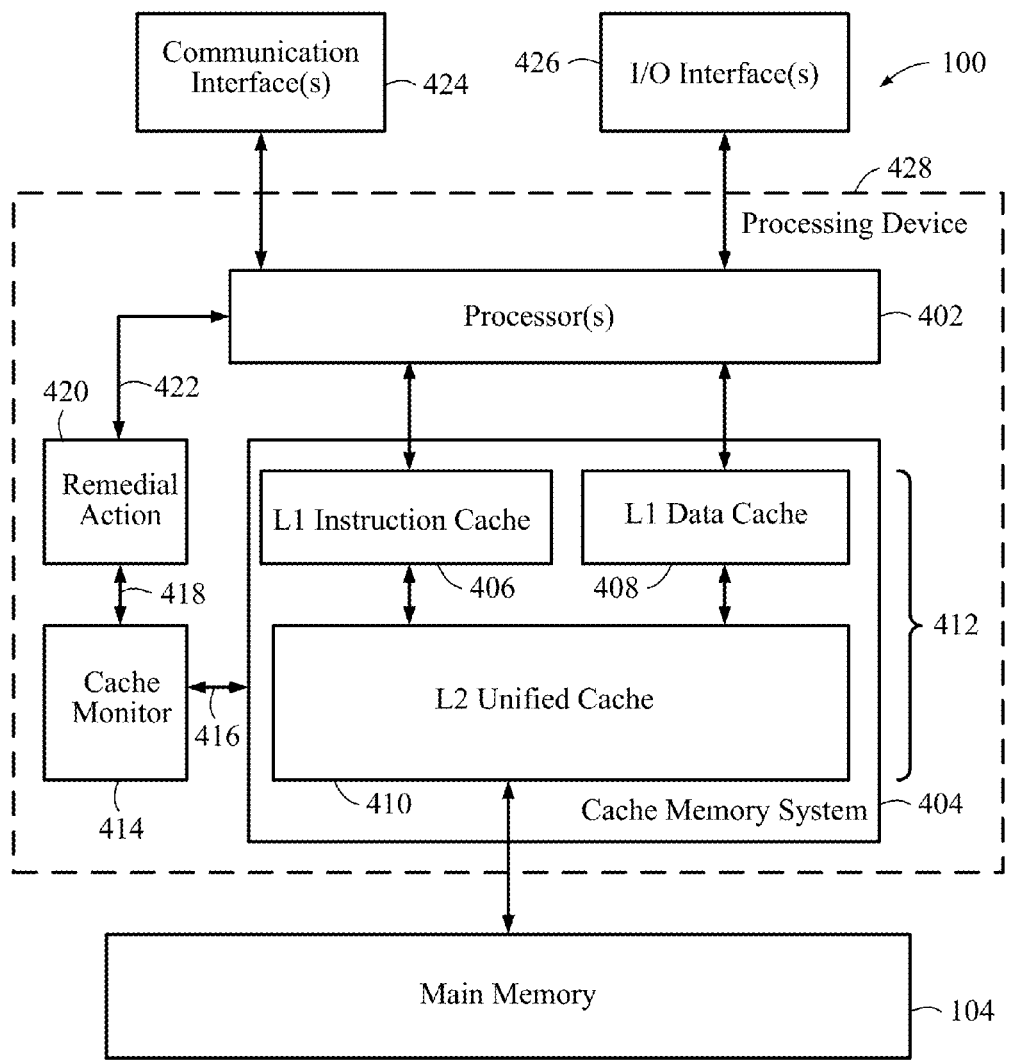
FIG. 4 illustrates an exemplary processing system including a cache memory system.

FIG. 4 illustrates an example of the processing system 100 including a cache memory system 404. The processing system 100 may include one or more processors 402, the cache memory system 404, and the main memory 104. Various communication interfaces 424 and Input/Output (I/O) interfaces 426 may also be included.

As non-limiting examples, communication interfaces 424 may include interfaces for communication on cellular networks, serial ports, parallel ports, Ethernet connections, universal serial bus (USB) connections, IEEE 1394 ("FIREWIRE™") connections, BLUETOOTH™ wireless connections, 802.11 a/b/g/n type wireless connections, and other suitable communication protocols and interfaces.

As non-limiting examples, I/O interfaces 426 may include interfaces to devices such as keyboards, mice, trackballs, haptic devices, audio inputs and outputs, and displays.

A cache monitor 414 is included to monitor whether various accesses to the cache memory system 404 are a "hit," meaning that the accessed data resides in the cache memory system 404 and is valid, or a "miss," meaning the desired location is not present in the cache memory system 404 or includes invalid data. Thus, bus 416 may indicate a miss or a hit, as well as other information, to the cache monitor 414. The cache monitor 414 may collect information such as a number of hits and a number of misses over a predefined time period or a predefined number of instruction fetches. Collected information about the hits and misses may be transmitted on bus 418 to a remedial action unit 420. The remedial action unit 420 may process the hit and miss information and report results to the processor 402 over bus 422. As is explained more fully below the information collected and identified for the processor 402 may vary for different examples or implementations and may be as simple as a hit/miss ratio to more complex, such as an instruction loading profile.

The function of the cache monitor 414, the function of the remedial action unit 420, or a combination thereof may be performed in hardware or software in different examples.

As a non-limiting example, one or more simple hardware counters in the cache monitor 414 may be used to keep track of cache hits, cache misses, or a combination thereof. The hardware counters may be cleared, preset, and read by software to control and analyze cache hit or miss information over specific time periods, specific number of instruction fetches, or a combination thereof. As one example, the remedial action unit 420 could be configured to determine a hit/miss ratio or instruction loading profile under software control. Control may be based on a push-type model where the hardware generates an interrupt based on meeting certain criteria in hardware. For example, if a certain threshold number of misses or fetches are is requested within a given time period, then the hardware may generate an interrupt. Control may also be based on a pull-type model where software may monitor the hardware registers relative to certain events such as elapsed time, context switch, and number of instructions fetched. In one example, the hardware registers may be checked on a periodic clock interrupt to ascertain whether an anomalous cache miss or instruction fetch condition is detected.

As another non-limiting example, more hardware could be included such as a threshold register or other profile information that could be set by a kernel or operating system based on expected behaviors for current operations. The hardware may then generate an interrupt when the hit/miss ratio exceeds or goes below the threshold register or profile information.

In some examples, the processor 402, cache memory system 404, cache monitor 414, and remedial action unit 420 may all be on the same semiconductor device or processing device 428. In other examples, the cache memory system 404 may be on a separate device from the processor 402. In such examples, the cache monitor 414 and remedial action unit 420 may be located with the processor 402, with the cache memory system 404, or split between the two devices.

Many cache memory systems 404 include a multi-level cache including two or more levels 412 of cache memory. The non-limiting example of FIG. 4 illustrates a first level of cache including a separate instruction cache 406 and a data cache 408. Separating instructions from data may create performance enhancements by creating parallel paths for fetching information and taking advantage of temporal and spatial proximity that may be different for instructions and data. A second level of cache is configured as a unified cache 410 including both instructions for the instruction cache 406 and data for the data cache 408. In addition, the cache memory system 404 may include different configuration for the caches, such as, for example set-associative caches and various replacement protocols for caches that are full, as would be known by a person of ordinary skill in the art of cache design.

Caches allow faster retrieval of instructions and data relative to having to go to the main memory 104. The tradeoff compared to traditional memory is in size. In general, smaller memory has higher bandwidth, lower latency or a combination of both. The main memory 104 is typically implemented as Dynamic Random Access Memory (DRAM), which can have relatively good bandwidth, but can have relatively long latencies. By caching frequently used data and instructions in a cache, fetches from the processor 402 can be received much more quickly and at a higher bandwidth. As a general rule, level 1 caches (i.e., caches closest to the processor 402) are smaller, faster, and have lower latency. Level 2 caches are generally larger, may be slower, and may have longer latencies. However, they are still faster than main memory 104 such that performance improvements are possible by including the second level of cache.

The cache memory system 404 of FIG. 4 is just one example. More of or fewer levels may be used and each level may be implemented as a unified cache 410 or separate instruction caches 406 and data caches 408. Examples discussed herein are mostly concerned with instructions. As a result, discussions may refer specifically to the instruction cache 406. However, a person of ordinary skill in the art will appreciate that these features may be practiced on any level of cache and in both the instruction cache 406 and the unified cache 410.

Processors exploit properties of spatial and temporal proximity to optimize what is kept in the cache and what may have to be retrieved from the main memory 104. For instance, frequently invoked code or functions may be kept in the instruction cache 406. Also, it is common for functions or code in a page to invoke other nearby or spatially proximate code (e.g., within the same page).

However, such assumptions of proximity do not necessarily hold for ROP gadgets, since the fundamental property of ROP exploits is that they stitch together small segments of code located at distinct and seemingly random parts of the memory. This distribution of gadgets may result in a lot of "misses" for ROP exploits. In other words, the processor 402 has to frequently load new lines into cache to find invoked gadgets. By contrast, the valid code sequences 300 (FIG. 3) may generally have far fewer misses and more "hits." In other words, a called function or code may be found in the same line already loaded in the cache. The different effects of ROP exploits on cache hit/miss characteristics compared to that of the valid code sequences 300 can be exploited to build a detection mechanism that prevents ROP payloads from successfully executing. Such a system (that monitors hit/miss characteristics) can be trained to a specific operating system (OS) or process.

Some features or aspects of the present disclosure allow the detection of execution of ROP exploits at the lowest level possible, therefore they can be applied not only at process, but OS-level granularity. Moreover, the various aspects or features may not be tied to source code or compile-time modifications. Some examples of the present disclosure do not necessarily rely on preventing the attacker from reading any parts of the memory or directly controlling the flow of execution. All currently known mechanisms for mitigating ROP exploits (specifically, ASLR) routinely get circumvented because either an additional bug leaks the memory layout to the attacker or some part of the memory turns out to still be easily predictable, thus providing an attack surface to find ROP payloads. In contrast, the proposed method can detect an ROP exploit execution even if the attacker would have full knowledge of the memory map of the exploited processes.

Figure 5:
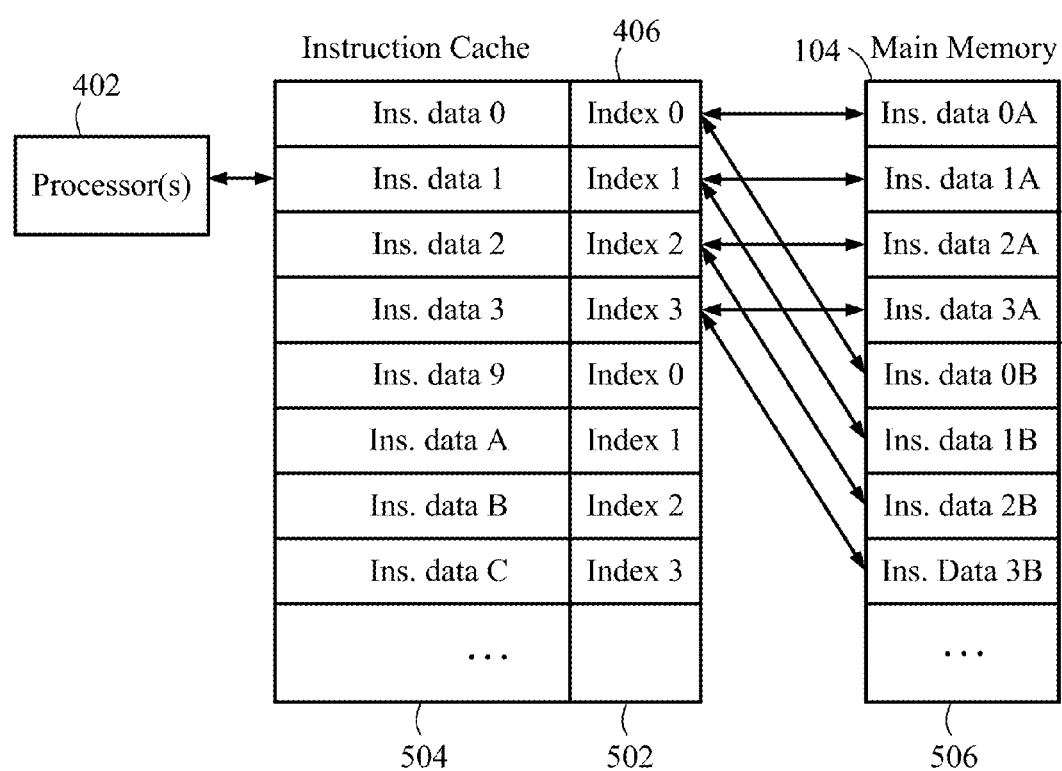
FIG. 5 illustrates details of an example of the cache memory system of FIG. 4.

FIG. 5 illustrates details of an example of the cache memory system 404 of FIG. 4 in a different context to explain operation of a cache as it relates to various aspects of the present disclosure. The instruction cache 406 includes a collection of lines with each line including an index portion 502 and a data portion 504. The index portion includes a partial address (usually the most significant bits MSBs) such that different areas of memory with the same MSBs may be mapped to a specific line of the instruction cache 406. Thus, as illustrated the cache line with index 2 may contain instruction data 2 that originates from instruction data 2A in the main memory 104 or instruction data 2B in the main memory 104. Each cache line may be overwritten (i.e., replaced) with a more recent instruction (i.e. temporally closer) if it is desired to load new instructions and there are no more cache lines available.

In operation, the processor 402 requests a specific address to retrieve an instruction. If that address matches an index in a line of the instruction cache 406, the instruction data (or a portion thereof) at the "hit" line is returned to the processor 402 as a cached instruction. If the requested address does not match any of the valid indexes in the instruction cache 406, a "miss" occurs and the instruction cache 406 fetches enough information from the main memory 104 including the non-cached instruction 506 to fill a line of the cache and places the index for the requested addresses in the line of the cache. Subsequent requests to that cache line with that particular index will now generate hits to a cached instruction and there will be no need to fetch the instruction data from the main memory 104.

Long cache lines create spatial proximity and the ability to replace cache lines with more recently used data creates temporal proximity. Valid code sequences 300 (FIG. 3) will generally have both good spatial proximity and good temporal proximity. On the other hand, ROP exploits will generally have poor spatial proximity and poor temporal proximity, due to the nature of the short snippets that may be located in many different areas of memory that are not necessarily accessed often.

Exemplary Return Oriented Programming Detection

Figure 6:
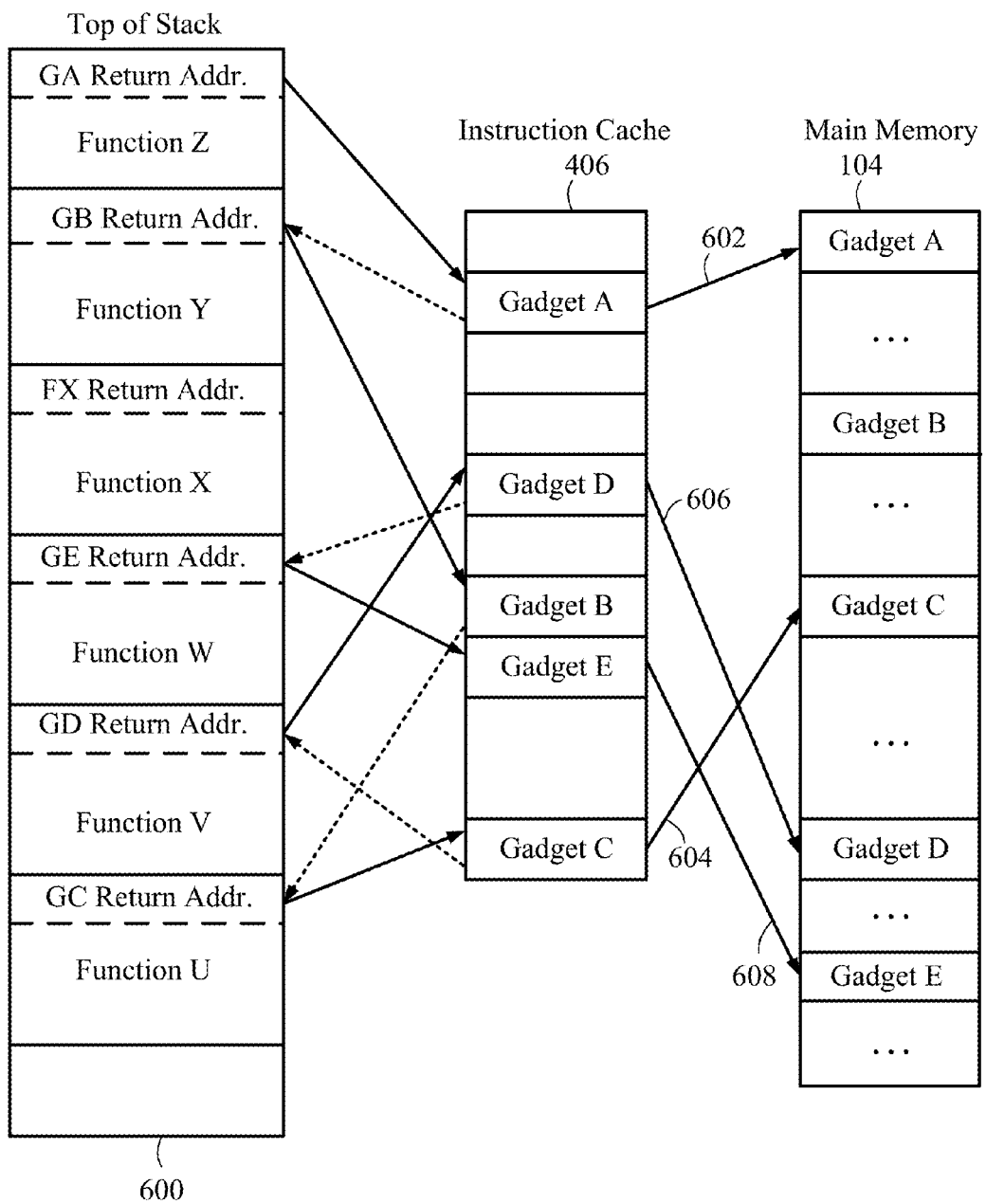
FIG. 6 illustrates an example of a corrupted call stack for generating a malicious code sequence including gadgets strung together to form a Return-Oriented Programming (ROP) exploit.

FIG. 6 illustrates an example of a corrupted call stack 600 for generating a malicious code sequence including gadgets strung together to form a Return Oriented Programming (ROP) exploit. The corrupted call stack 600 is in a corrupted form due to an attacker modifying one or more of the return addresses on the corrupted call stack 600. Also illustrated in FIG. 6 are a portion of the instruction cache 406 and a portion of the main memory 104.

With reference to FIGS. 3, 5 and 6, the corrupted call stack 600 may include frames for functions U-Z. Solid arrows from the corrupted call stack 600 to the instruction cache 406 indicate return addresses popped off the stack causing the processor 402 to begin execution at the beginning of a particular gadget. Dashed arrows from the instruction cache 406 to the corrupted call stack 600 indicate return instruction executed at the end of the particular gadget to fetch the return address from the stack.

In the corrupted call stack 600, the return address for function Z has been modified to point to a start address of gadget A. Similarly, the return address for function Y has been modified to point to a start address of gadget B, the return address for function W has been modified to point to a start address of gadget E, the return address for function V has been modified to point to a start address of gadget D, and the return address for function U has been modified to point to a start address of gadget C. The return address for function X has not been modified.

Because of these modifications, when function Z completes its operation and the return instruction 302 is performed, rather than return to the proper place, control continues at the beginning of gadget A, for which the address has been placed in the return address of function Z. Every gadget ends with a return instruction 302. Thus, when gadget A completes its return instruction 302 points to the return address of function Y. However, the return address of function Y has been modified to point to the beginning of gadget B. As a result, rather than return to the proper place, control continues at the beginning of gadget B. Continuing with the gadget executions, after gadget B completes, rather than return to the proper place for function U, control continues at the beginning of gadget C. After gadget C completes, rather than return to the proper place for function V, control continues at the beginning of gadget D. After gadget D completes, rather than return to the proper place for function W, control continues at the beginning of gadget E. This stringing together of gadgets A-E can perform significant functions forming at least a part of an ROP exploit.

However, because these gadgets A-E may exist at diverse addresses, they may cause a larger number of cache misses than if program execution had happened normally. In the non-limiting example of FIG. 6, gadget A is not located in the instruction cache 406 causing a miss and the need to fetch the non-cached code snippet 602 from the main memory 104. Similarly, gadgets C, D, and E miss the instruction cache 406 causing fetches of non-cached code snippets 604, 606, and 608, respectively, from the main memory 104. The fetch of gadget B caused a hit allowing return of a cached code snippet for gadget B.

With longer ROP exploit payloads made up of more code snippets, the trend of a larger than expected number of misses relative to hits becomes more apparent and confidence is increased that an ROP exploit may be the cause.

Figure 7:
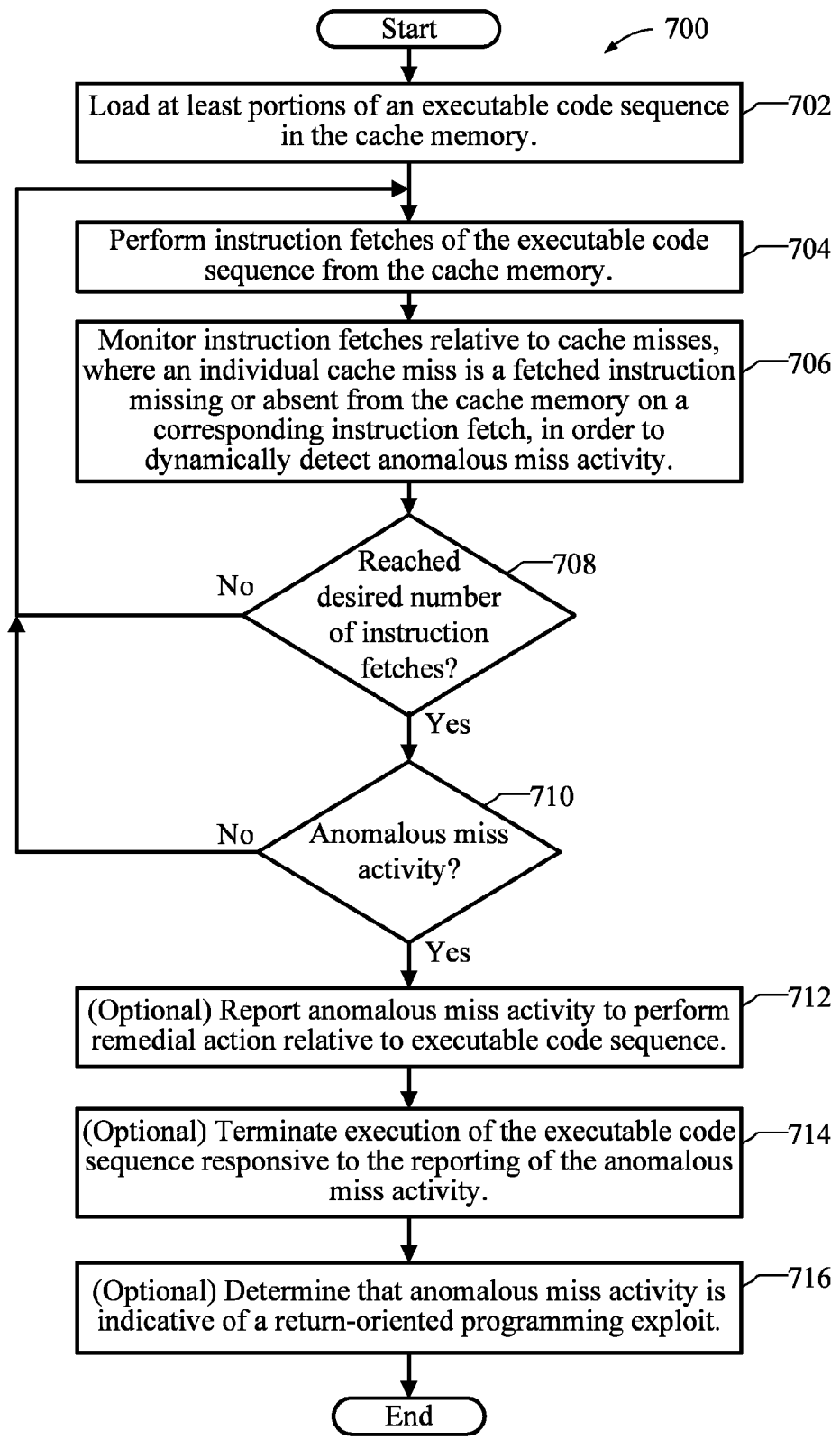
FIG. 7 is a flow diagram showing an exemplary process to detect anomalous miss activity for the cache memory to detect and terminate an ROP exploit.

FIG. 7 is a flow diagram showing an exemplary process 700 to detect anomalous miss activity for the cache memory to detect and terminate an ROP exploit. Process 700 will be described with reference to FIGS. 7 and 4. In operation block 702, the process includes loading an executable code sequence in the cache memory. In other words, at least some of the cache lines are loaded with at least portions of executable code sequences. In operation block 704, the processor 402 performs instruction fetches of the executable code sequences from the cache memory, which may include cache hits and cache misses. These code sequences may be valid code sequences or they may be a series of gadgets forming an ROP exploit payload.

In operation block 706, the cache monitor 414 alone, in combination with the remedial action unit 420, or in combination with both the remedial action unit 420 and the processor 402, monitors the instruction fetches relative to cache misses to dynamically determine if there is anomalous miss activity, wherein cache misses are fetched instructions absent from the cache memory on the instruction fetch. The instruction fetches are monitored dynamically during execution of the instructions rather than monitoring instruction fetches in an effort to predetermine cache hit/miss behavior relative to a specific instruction sequence. The anomalous miss activity may be determined by different metrics. Some non-limiting metrics are the number of cache hits relative to the number of cache misses to develop a hit/miss ratio, the number of cache misses relative to the number of instruction fetches, the number of cache misses over a certain time period, or the number of cache misses over an expected code sequence. As a non-limiting example, this hit/miss ratio may be a moving average as instructions are fetched. Of course, a hit/miss ratio may be conversely expressed as a miss/hit ratio.

In some examples, a certain predefined number of instruction fetches may be desired to determine the anomalous miss activity. Decision block 708 indicates that a test occurs to see if the desired number of fetches has been reached. If not, control returns to operation block 704 as more instructions are fetched and executed. As non-limiting examples, the desired number of fetches may be set at numbers such as 10, 50, and 100 instructions. In addition, the desired number of fetches may be determined over a predefined time period. As another non-limiting example the desired number of fetches may be correlated to a predetermined operating context such as execution of specific software programs, specific software libraries, or specific operating system operations.

If enough instruction fetches have occurred, decision block 710 indicates a test to see if anomalous miss activity has been detected, which may be defined as a hit/miss ratio below a threshold. If not, valid code sequences are likely being executed and control returns to operation block 704 to monitor more instruction fetches.

If there is anomalous miss activity, it is likely that an ROP exploit is executing and operation block 712 indicates that the anomalous miss activity may be reported such that remedial action may be taken relative to the executable code sequence. As explained earlier, the reporting may be to the remedial action unit 420, or to the processor 402.

Operation block 714 indicates that one type of remedial measure that may be performed would be to terminate execution of the executable code sequence in response to the reporting of the anomalous miss activity. This termination may terminate many different ways, such as, for example, creating a hardware or software exception or creating a hardware or software interrupt.

The threshold may be selected to be lower than typical hit/miss ratios for valid code sequences. For instance, the hit/miss threshold may be empirically selected for each operating system and/or processor type.

Moreover, there may be periods of execution, or execution of certain types of valid code sequences, where a larger number of misses may be expected, such as, for example, during a boot up stage where the caches have not yet been loaded with valid instructions or particular valid code sequences that may cause cache trashing. Thus, there may be selected operational periods, such as during initial boot-up of a processor 402 or operating system when the monitoring acts may be suspended. If these types of events are known, more complex instruction loading profiles may be developed for both valid code sequences and ROP exploits.

Operation block 716 indicates that the process may also determine that the anomalous miss activity is indicative of a return-oriented programming exploit. While illustrated at the end, if the act of operation block 716 is performed, it may be performed earlier in the process in a manner that operations 712 and 714 may be responsive to the determination of a potential ROP exploit.

Figure 8:
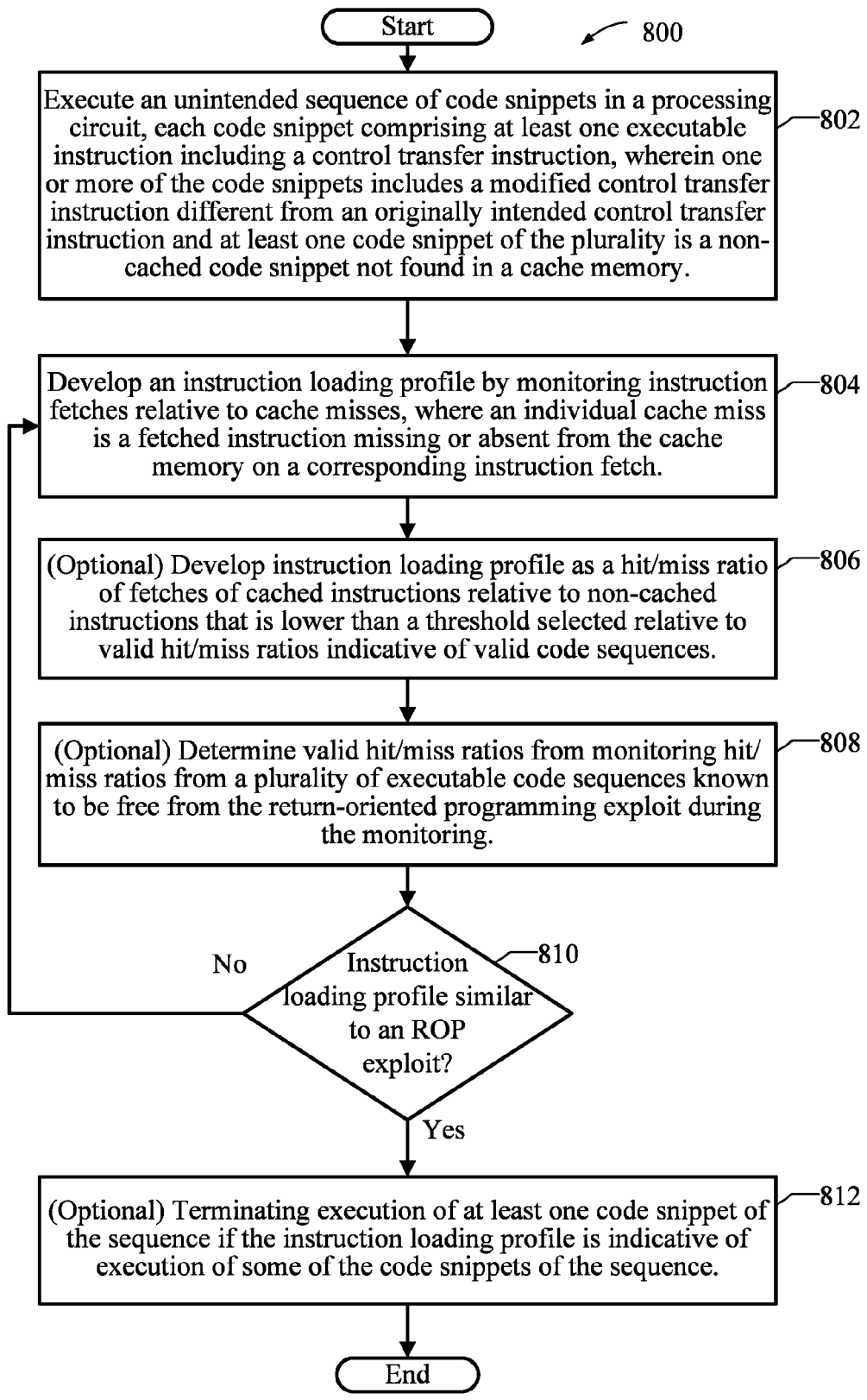
FIG. 8 is a flow diagram showing an exemplary process to develop an instruction loading profile and perform remedial actions responsive to the analysis of the instruction loading profile.

FIG. 8 is a flow diagram showing an exemplary process 800 to develop an instruction loading profile and perform remedial actions responsive to the analysis of the instruction loading profile. Process 800 will be described with reference to FIGS. 8 and 4. Operation block 802 indicates that the process executes an unintended sequence of code snippets in a processing circuit 402, each code snippet comprising at least one executable instruction including a control transfer instruction. At least one code snippet of the plurality is a non-cached code snippet not found in a cache memory. The process executes an unintended code sequence because one or more of the code snippets includes a modified control transfer instruction different from an originally intended control transfer instruction. As non-limiting examples, a control transfer instruction may include instructions such as jump instructions, return instructions, and branch instructions. Thus, an originally intended control transfer function is, for example, a return instruction that was originally placed on the call stack as the valid program intended. In an ROP exploit, the originally intended control transfer function may be changed to a modified control transfer instruction to perform a different function resulting in the unintended sequence of code snippets.

Operation block 804 indicates that the process develops an instruction loading profile by monitoring the instruction fetches relative to cache misses, where the cache misses are fetched instructions absent from the cache memory on the instruction fetch. In other words, cache hits and cache misses are monitored during execution of valid code sequences and code snippets. As these instruction fetches occur, an instruction loading profile may be developed. The instruction loading profile may be quite complex and track events and actions such as for example temporal separation and spatial separation between cache misses and may even track replacement of cache line indexes to indicate if certain cache lines are more likely to be involved in ROP exploits. On the other hand, the instruction loading profile may be as simple as the hit/miss ratio discussed above with reference to FIG. 7.

Operation block 806 indicates that the instruction loading profile may be developed as a hit/miss ratio of fetches of cached instructions relative to non-cached instructions. The operation may monitor to see if the hit/miss ratio is lower than a threshold that may be determined or selected relative to valid hit/miss ratios indicative of valid code sequences.

Operation block 808 indicates that the valid hit/miss ratios may be determined from monitoring hit/miss ratios from a plurality of executable code sequences known to be free from the return-oriented programming exploit during monitoring the hit/miss ratios, as is explained more fully below with reference to FIG. 9.

Decision block 810 indicates that a test may be performed to see if the current instruction loading profile is similar to an instruction loading profile of an ROP exploit. If not, control may return to operation block 804 to monitor additional instruction fetches and whether they cause cache hits or cache misses.

If the current instruction loading profile is similar to an instruction loading profile of an ROP exploit, operation block 812 indicates that remedial actions relative to the executable code sequences may be performed if the instruction loading profile is indicative of execution of a return-oriented programming exploit involving one or more of the executable code sequences. As a non-limiting example, a remedial action may be terminating execution of at least one code snippet of the sequence if the instruction loading profile is indicative of execution of some of the code snippets of the sequence above with reference to FIG. 7.

Profiles for both valid code sequences and ROP exploits may be developed ahead of time in a test environment for use during normal operation.

Figure 9:
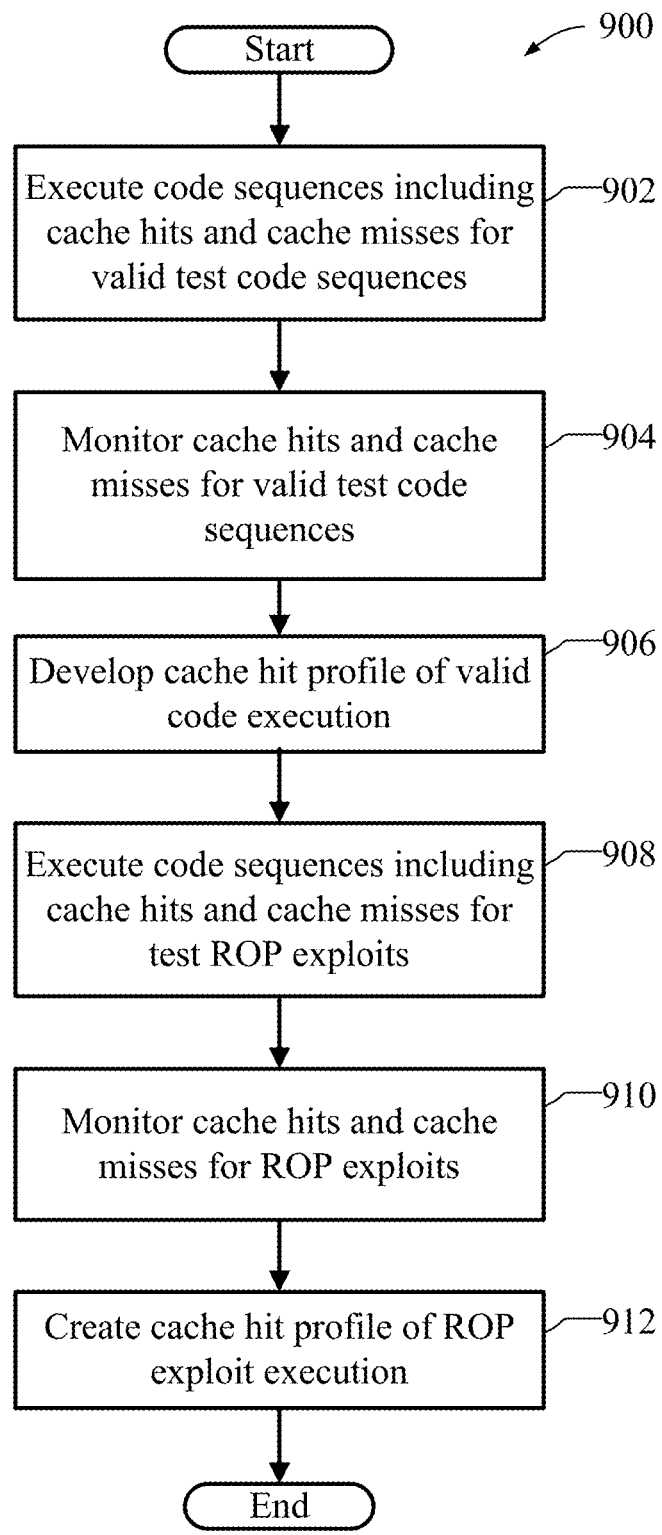
FIG. 9 is a flow diagram showing an exemplary process to develop information about execution of valid code sequences for use in analyzing instruction loading profiles.

FIG. 9 is a flow diagram showing an exemplary process 900 to develop information about execution of valid code sequences and ROP exploits for use in analyzing instruction loading profiles. Process 900 will be described with reference to FIGS. 9 and 4. In operation block 902, valid test code sequences are executed. In operation block 904, cache hits and cache misses are monitored for the valid test code sequences. In one example, a valid hit/miss ratio may be developed from execution of the valid test code sequences. Operation block 906 indicates that various instruction loading profiles can be developed for valid code sequences. In this way, valid code sequences that may have a relatively low hit/miss ratio may still have other hit/miss characteristics that would identify them as valid code sequences rather than ROP exploits. Operation blocks 902, 904, and 906 may be repeated for any number of valid code sequences that might be of interest.

In operation block 908, test ROP exploit sequences are executed. In operation block 910, cache hits and cache misses are monitored for the test ROP exploit sequences. Operation block 912 indicates that various instruction loading profiles can be developed for the test ROP exploit sequences. Because attackers can be quite creative and do unexpected things, developing test ROP exploit sequences may be more difficult than identifying valid code sequences of interest. However, the development of instruction loading profiles for at least some ROP exploits may help the cache monitor 414, remedial action unit 420, and processor 402 make more informed decisions on whether an ROP exploit is executing.

Returning to FIG. 8, with instruction loading profiles for both valid code sequences 300 and ROP exploits, decision block 808 may be expanded to test whether the current instruction loading profile is similar to an ROP exploit or dissimilar from a valid code sequence.

It should be pointed out that the processes discussed herein relative to FIGS. 7, 8, and 9 are processes related to detecting ROP exploits by monitoring the cache memory system 404 and are not necessarily processes related to execution of software programs running on the processing system 100.

Specific implementations shown and described are only examples and should not be construed as the only way to implement the present disclosure unless specified otherwise herein. It is readily apparent to one of ordinary skill in the art that the various examples in the present disclosure may be practiced by numerous other solutions.

One or more of the components, acts, features and/or functions described herein and illustrated in the drawings may be rearranged and/or combined into a single component, act, feature, or function or embodied in several components, acts, features, or functions. Additional elements, components, acts, and/or functions may also be added without departing from the various features and/or aspects described herein. The algorithms described herein may also be efficiently implemented in software and/or embedded in hardware.

In the description, elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It is readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Also, it is noted that the examples may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals, including a single data signal.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Moreover, a storage medium may represent one or more devices for storing data, including read-only memory (ROM), random access memory (RAM), magnetic disk storage media, optical storage media, flash memory devices and/or other machine-readable media and, processor-readable media, and/or computer-readable media for storing information. The terms "machine-readable medium," "computer-readable medium," and/or "processor-readable medium" may include, but are not limited to non-transitory media such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, various features and/or aspects may be implemented in hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. A general-purpose processor, configured for executing features described herein, may be considered a special purpose processor for carrying out such features. Similarly, a general-purpose computer may be considered a special purpose computer when configured for carrying out features described herein.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM, flash memory, ROM, EPROM, EEPROM, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the examples and features disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, software, or a combination thereof depends upon the particular application and design selections imposed on the overall system.

The various features described herein can be implemented in different systems. It should be noted that the foregoing examples and are not to be construed as limiting. The description of the examples is intended to be illustrative, and not to limit the scope of the claims. As such, the present teachings can be readily applied to other types of apparatuses and many alternatives, modifications, and variations will be apparent to those skilled in the art.

What is claimed is:

1. A method, comprising:
   executing a sequence of code snippets in a processing circuit, each code snippet including at least one executable instruction including a control transfer instruction, wherein one or more of the code snippets includes a modified control transfer instruction different from an unmodified control transfer instruction and at least one code snippet of the sequence is a non-cached code snippet not found in a cache memory;
   detecting one or more instruction fetch cache misses in response to instruction fetches performed during execution of the sequence of code snippets, where an individual instruction fetch cache miss represents a fetched instruction absent from the cache memory for a corresponding instruction fetch of an executable code sequence;
   developing an instruction loading profile by monitoring instruction fetches relative to instruction fetch cache misses; and
   controlling an execution of at least one instruction based on the instruction loading profile.

2. The method of claim 1, wherein controlling execution of the at least one instruction based on the instruction loading profile further comprises:
   terminating execution of at least one code snippet of the sequence of code snippets if the instruction loading profile is indicative of execution of at least one of the code snippets of the sequence of code snippets.

3. The method of claim 1, wherein executing the sequence of code snippets includes utilizing a multi-level cache as the cache memory and cached instructions are instructions in a first cache level and non-cached instructions are instructions in a main memory or a second cache level.

4. The method of claim 1, further comprising:
   developing the instruction loading profile as a hit/miss ratio of fetches of cached instructions relative to non-cached instructions that is lower than a threshold selected relative to valid hit/miss ratios indicative of valid code sequences.

5. The method of claim 4, further comprising:
   determining the valid hit/miss ratios from monitoring hit/miss ratios from a plurality of executable code sequences known to be free from a return-oriented programming exploit during the monitoring.

6. The method of claim 1, wherein controlling the execution of the at least one instruction based on the instruction loading profile further comprises determining if the instruction loading profile corresponds to a return-oriented programming (ROP) exploit and, if so, initiating at least one remedial action.

7. A processing device, comprising:
   a processing circuit configured to fetch and execute executable code sequences, the executable code sequences including a sequence of code snippets, each code snippet including at least one executable instruction including a control transfer instruction, wherein one or more of the code snippets includes a modified control transfer instruction different from an unmodified control transfer instruction;
   a cache memory system operably coupled to the processing circuit and including a cache memory wherein at least one code snippet of the sequence is a non-cached code snippet not found in the cache memory;
   a cache monitor configured to detect one or more instruction fetch cache misses in response to instruction fetches performed during execution of the sequence of code snippets, where an individual instruction fetch cache miss represents a fetched instruction absent from the cache memory for a corresponding instruction fetch of an executable code sequence, the cache monitor further configured to develop an instruction loading profile by monitoring the instruction fetches relative to instruction fetch cache misses; and a remedial action unit configured to control an execution of at least one instruction based on the instruction loading profile.

8. The processing device of claim 7, wherein the cache memory system includes a data cache and an instruction cache and the cache monitor is configured to develop the instruction loading profile from the instruction cache.

9. The processing device of claim 7, wherein the cache memory system includes two or more levels of cache and the cache monitor is configured to develop the instruction loading profile for at least one of the two or more levels of cache.

10. The processing device of claim 7, further comprising: a remedial action unit and wherein the cache monitor, the remedial action unit, the processing circuit, or a combination thereof is configured to develop the instruction loading profile as a hit/miss ratio of fetches of cached instructions relative to non-cached instructions that is lower than a threshold selected relative to valid hit/miss ratios indicative of valid code sequences.

11. The processing device of claim 10, wherein the cache monitor, the remedial action unit, the processing circuit, or a combination thereof is configured to determine the valid hit/miss ratios from monitoring the hit/miss ratios from a plurality of executable code sequences known to be free from a return-oriented programming exploit during the monitoring.

12. The processing device of claim 7, wherein the cache monitor is configured to suspend monitoring during a selected operational period.

13. The processing device of claim 7, wherein the remedial action unit is further operative to determine if the instruction loading profile corresponds to a return-oriented programming (ROP) exploit and, if so, perform at least one remedial action.

14. A processing device, comprising:
means for executing a sequence of code snippets in a processing circuit, each code snippet including at least one executable instruction including a control transfer instruction, wherein one or more of the code snippets includes a modified control transfer instruction different from an unmodified control transfer instruction and at least one code snippet of the sequence is a non-cached code snippet not found in a cache memory;
means for detecting one or more instruction fetch cache misses in response to instruction fetches performed during execution of the sequence of code snippets, where an individual instruction fetch cache miss represents a fetched instruction absent from the cache memory for a corresponding instruction fetch of an executable code sequence; and
means for developing an instruction loading profile by monitoring instruction fetches relative to instruction fetch cache misses; and means for controlling an execution of at least one instruction based on the instruction loading profile.

15. The processing device of claim 14, further comprising:
means for terminating execution of at least one code snippet of the sequence of code snippets if the instruction loading profile is indicative of execution of at least one of the code snippets of the sequence of code snippets.

16. The processing device of claim 14, further comprising:
means for developing the instruction loading profile as a hit/miss ratio of fetches of cached instructions relative to non-cached instructions that is lower than a threshold selected relative to valid hit/miss ratios indicative of valid code sequences.

17. The processing device of claim 14, wherein the means for controlling the execution of the at least one instruction is further operative to determine if the instruction loading profile corresponds to a return-oriented programming (ROP) exploit and, if so, perform at least one remedial action.

18. A non-transitory machine-readable medium having instructions stored thereon, which when executed by a processing circuit cause the processing circuit to:
execute a sequence of code snippets, each code snippet including at least one executable instruction including a control transfer instruction, wherein one or more of the code snippets includes a modified control transfer instruction different from an unmodified control transfer instruction and at least one code snippet of the sequence is a non-cached code snippet not found in a cache memory;
detect one or more instruction fetch cache misses in response to instruction fetches performed during execution of the sequence of code snippets, where an individual instruction fetch cache miss represents a fetched instruction absent from the cache memory for a corresponding instruction fetch of an executable code sequence; and
develop an instruction loading profile by monitoring instruction fetches relative to instruction fetch cache misses; and
control an execution of at least one instruction based on the instruction loading profile.

19. The non-transitory machine-readable medium of claim 18, wherein the instructions further cause the processing circuit to terminate execution of at least one code snippet of the sequence of code snippets if the instruction loading profile is indicative of execution of at least one of the code snippets of the sequence of code snippets.

20. The non-transitory machine-readable medium of claim 18, wherein the instructions further cause the processing circuit to control the execution of the at least one instruction based on the instruction loading profile by determining if the instruction loading profile corresponds to a return-oriented programming (ROP) exploit and, if so, performing at least one remedial action.

* * * * *